Oct. 19, 1926.

K. E. PEILER 1,603,979

PLUNGER STOP FOR GLASS PRESSES

Filed Dec. 21, 1920

Inventor
Karl E. Peiler
by: *Wm. H. Honiss* Atty.

Patented Oct. 19, 1926.

1,603,979

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

PLUNGER STOP FOR GLASS PRESSES.

Application filed December 21, 1920. Serial No. 432,260.

This invention relates to improvements in glass shaping machines, and is designed particularly for use in connection with any machine which performs a pressing operation.

It is an object of this invention to provide means for preventing damage when the glass being pressed adheres to the plunger as the latter is raised, and this invention consists in providing means for stopping the pressing mechanism when this occurs.

For convenience of illustration and description, but without in any way limiting this invention, it is herein shown as applied to a glass pressing machine shown in a pending application of Karl E. Peiler and Edward H. Lorenz, Ser. No. 249,244, filed August 10, 1918, various features not essential to the present invention being omitted from the accompanying drawings, in which:—

Figure 1:
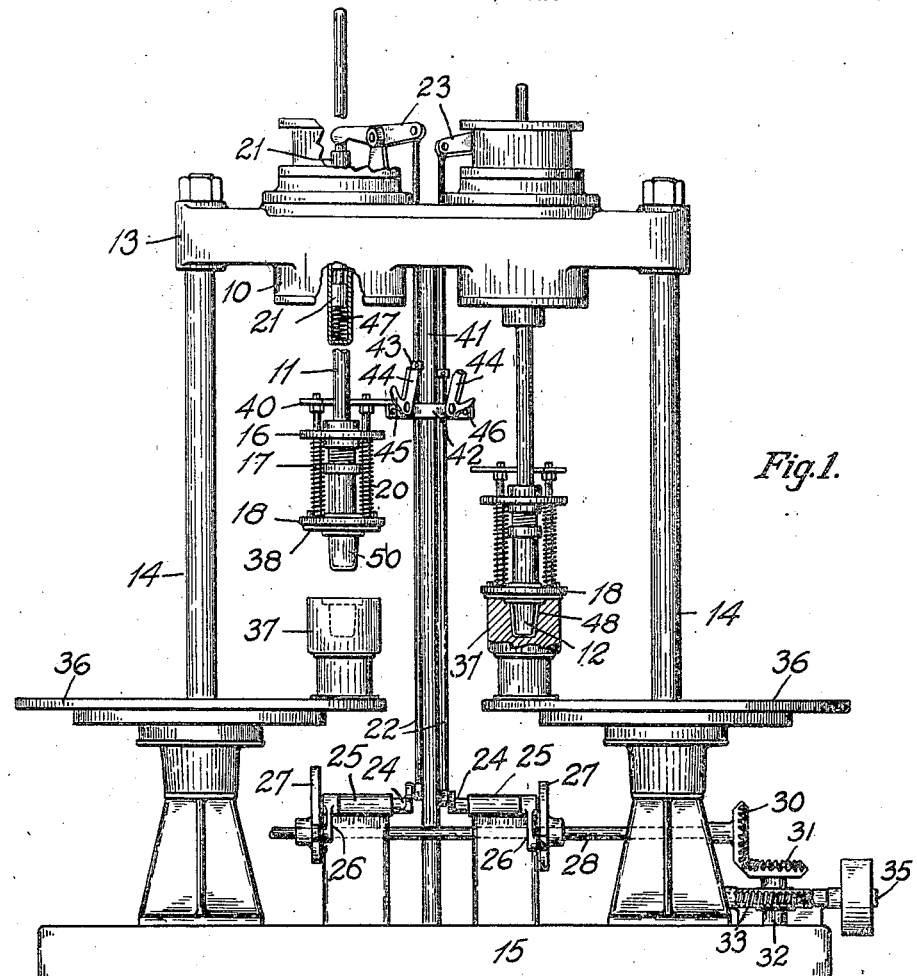
Figure 1 is a front elevation of a machine embodying this improvement, with parts broken away.

The machine shown herein has right-hand and left-hand pressing mechanisms, both supported by the same framework and actuated by the same operating mechanism. Corresponding parts of the similar mechanisms are indicated by similar reference characters. As this supporting structure forms no part of the present invention, it will only be described briefly.

Two cylinders 10, having piston rods 11, carrying plungers 12, are mounted on a tie 13 secured to a pair of supporting columns 14, mounted on bed 15.

To hold down the plunger rings, which close the mold top during the pressing operation and to disengage the pressed glass from a plunger after each pressing operation, a stripper plate mechanism is secured to the lower portion of each piston rod, and comprises stripper spring plate 16 secured directly to the piston rod and carrying bolts 17 fastened at their lower ends in stripper plates 18 that surround the plungers 12. Stripper springs 20, carried on bolts 17, press the stripper plate downwardly until stopped by the bolt heads seating on the spring plate 16. During pressing the springs hold the plunger ring against the mold top to close the latter.

The pistons are controlled by slide valves 21 operated by valve rods 22, through valve levers 23, pivoted in brackets on tie 13 and working against springs 47 below the valves. The lower ends of the valve rods are attached to rocker arms 24, secured on rock shafts 25, supported in suitable brackets on the bed, these shafts being actuated by their cam arms 26 engaging suitable cams 27 on a cam shaft 28, and driven through bevel gears 30 and 31. The latter is integral with worm wheel 33 and carried with it on stud 32. The worm wheel 33 is driven by a worm on a power shaft 35, supplied with power from any suitable source.

Mold tables 36 operated by any suitable means in time with the cam shaft 28 are also mounted on the bed 15 and carry any convenient number of molds 37, of which only one is shown on each table.

In the embodiment of the invention shown herein, suitable plunger rings 38 are made separate from but are attached to the stripper plates 18 in accordance with the usual practice, to enable the plunger ring to be removed and other rings substituted for different forms and sizes of ware. However, for the performance of its stripper function, which is mainly involved in the present invention, the plunger ring and stripper plate might be made in a single integral piece, but in either event in case the stripping mechanism fails to act, because of the adhesion of the pressed or partially pressed glass to the plunger on its up-stroke, the resultant displacement of the stripper mechanism causes the stopping of the pressing mechanism. This is effected by providing the stripper mechanism with a projecting portion for contacting with mechanism to be described later. For this purpose, the projecting portion may be a dog 40 secured to the upper ends of the stripper plate bolts 17, as shown herein, or it may be integral with or secured to any other convenient part of the stripper mechanism, as for instance the plunger ring 38 or the stripper plate 18, in which event the parts with which it cooperates would be correspondingly lowered in position.

Attached to a column 41 is a latch bracket 42, provided with openings through which pass valve rods 22, carrying collars 43. To the bracket are pivoted latches 44 provided with trip fingers 45 and stop pins 46 to limit downward movement of the trip fingers.

In normal operation, the spring 47 below each slide valve 21 tends to raise the valve and lower the valve rod 22 holding cam arm 26 against cam 27. Lowering the valve rod allows the valve to rise and admit air above the piston forcing it down and causing plunger 12 to descend into the glass in the mold to form an article 48. This also lowers the stripper spring plate 16 until the plunger ring 38 contacts with the mold 37, and the springs 20 compress, causing the bolts 17 to project above the stripper spring plate 16. Cam 27 then lifts the valve rod, lowering the slide valve and admitting air below the piston to raise the plunger, whereupon the stripper springs 20 force the stripper plate 18 and plunger ring 38 down, stripping the pressed glass 48 off of the plunger and leaving it in the mold. The plunger ring remains in contact with the mold and the stripping action continues until the heads of the bolts 17 bear against the stripper spring plate 16, whereupon it is lifted off and rises with the plunger.

Figure 2:
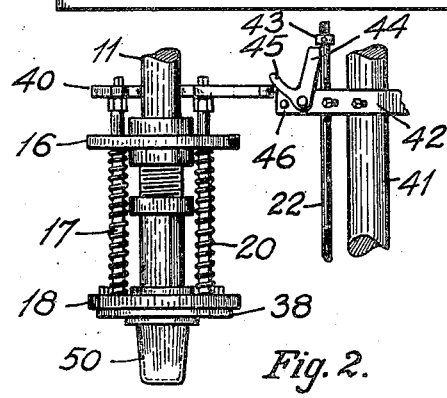
Figs. 2 and 3 are detail views on an enlarged scale of the plunger stop mechanism disclosed at the left of Fig. 1, Fig. 2 showing the stop in operating position, and Fig. 3 showing it in non-operating position.
Figure 3:
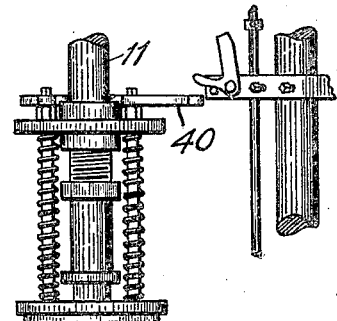

In these operations the glass is liable to adhere to the plunger and be drawn out of the mold with the plunger, due to the contraction of the chilled glass upon it, or the overheating of the plunger. To guard against such withdrawal, the stripper mechanism is employed, but in case the adhesion is too great, the pressure of the stripper springs 20 will be insufficient to force the strip plate down and strip the glass off the plunger. Hence the pressed glass 50 will rise with the plunger, as shown at the left of Fig. 1 and in Fig. 2. In such a case the machine should be stopped promptly to facilitate quick removal of the adhering glass to prevent further overheating, and allow the plunger to be cooled, as otherwise the plunger with its adhering glass will be forced down, into the succeeding mold or molds, each carrying its additional charge of glass. This is liable to damage the parts or their actuating mechanism by overstraining them, besides increasing the difficulty of removing the glass from the rapidly overheating plunger. Under such circumstances the stripper mechanism will continue to be displaced relative to the plunger, and the bolts 17 will continue to project above the stripper spring plate 16. Consequently, when the plunger has risen to the position shown in these figures, dog 40, due to its upward displacement, will rise high enough to strike trip finger 45 and throw latch 44 inwardly against valve rod 22. This brings latch 44 below collar 43, which is now in its upper position, the valve rod 22 having risen to cause the plunger to lift. In this position (Fig. 2) the latch prevents the valve rod from lowering, thus preventing further operation of the piston and plunger until the operator removes the glass 50 adhering to the plunger and releases the latch, throwing it back against stop pin 46, but the action of the plunger mechanism of the other press will not be affected.

Thus this invention provides simple and positive means for preventing serious damage in case an article adheres to any individual plunger.

It will be obvious that this invention is not limited to presses in which the plungers are actuated pneumatically as it may be modified in various ways to adapt it to other types of presses. For example, in the case of a plunger operated by a crank, by cams, or by an eccentric, the movement of the displaced dog 40 may be adapted to disconnect a clutch or other driving connection of the plunger actuating means.

In various other ways within the scope of the appended claims, the invention may be modified to suit different constructions or arrangements of machines to which it is applied.

What is claimed as new is:—

1. In a glass shaping machine, the combination with glass pressing elements including a mold, of actuating means for moving one of said elements relative to the other to press glass in said mold, and means controlled by abnormal adhesion of glass to said pressing means for discontinuing the operation of said actuating means.

2. In glass shaping mechanism, the combination with a pressing plunger and its actuating means, and means for stripping the glass from the plunger after each pressing operation, of means actuated by the stripping means, when in abnormal position by failure to complete its stripping function, for arresting further actuation of the plunger.

3. In a glass shaping machine, the combination of a plunger, a stripping device therefor, a valve controlled means for operating said plunger, and means cooperating with the stripping device and with the valve controlling means for preventing the operation of the plunger when the stripping device fails to perform its stripping function.

4. In a glass shaping machine, the combination with pressing mechanism including a mold and plunger, of a valve-controlled air cylinder for effecting relative movement of the mold and plunger, and means controlled by the presence of adhering glass on said plunger for preventing the effective operation of said valve.

5. In a glass shaping machine, the combination of a pressing mechanism including a plunger, an air cylinder for operating same, a valve for admitting air to the cylinder, a connection for operating said valve, and means controlled by the adhesion of glass to said plunger for preventing the motion of said connection.

6. In a glass shaping machine, the combination of a mold, pressing means associated therewith, actuating means for moving one of said elements relative to the other to press glass in said mold, and latch mechanism adapted to be operated by said pressing means to render said actuating means inoperative when glass adheres to said pressing means.

7. In a safety device for a glass shaping machine, the combination of a mold, pressing means cooperating therewith, fluid-pressure means for effecting relative movement between said mold and said pressing means, valve mechanism for controlling the operation of said fluid pressure means, and latch mechanism adapted to be actuated by said pressing means to discontinue the operation of said valve mechanism when glass adheres to said pressing means.

8. In a glass shaping machine, the combination of a plunger, a plunger ring, a dog appurtenant to the plunger ring, a latch bracket, a latch mounted thereon, a valve operating rod having a collar mounted thereon, and means for causing said dog to move said latch into a position which will prevent the descent of the valve operating rod in case the pressed glass adheres to the plunger.

9. In a glass shaping machine, the combination of a plunger, a plunger ring, means for actuating said members, and means controlled by the position of the plunger ring for arresting further operation of the plunger when the plunger ring is in abnormal position after a pressing operation.

10. In a glass shaping machine, the combination of a plunger, a plunger ring, means for actuating said members, and means, including a latch, operable upon abnormal position of the plunger ring after a shaping operation to arrest the operation of the said actuating means.

11. In a glass shaping machine, the combination of a pressing plunger, a plunger ring arranged to be displaced relative to the plunger by a pressing operation, and means for arresting further operation of the plunger when the plunger ring remains in displaced position relative to the plunger after the pressing operation.

12. In a glass shaping machine, the combination of a plunger, a plunger ring arranged to be displaced relative to the plunger by a pressing operation, means for restoring these parts to their former positions in the normal operation of the machine, and means for arresting further operation of the plunger in case the plunger ring remains displaced relative to the plunger after the pressing operation.

13. In a glass shaping machine including two pressing members and means for relatively moving said members periodically to press glass therebetween, the combination of means for detecting the abnormal presence of glass on one of said members during the non-pressing period, and means rendered operative by such detecting means for stopping the said relative movement.

14. In a glass shaping machine having a pressing plunger, the combination of a member movable relative to the plunger, means for periodically moving the member relative to the plunger, and means rendered operative by the interruption of said relative movement of the member, for stopping the pressing operation of the plunger.

15. In a glass shaping machine, the combination with a plunger and a cooperating mold, of a pressure actuated piston and cylinder arranged to cause the plunger and mold to press glass therebetween, means for detecting the presence of glass on the plunger when in non-pressing position, and connections between the detecting means and the pressure supply of the cylinder operative to prevent admission of actuating pressure to the cylinder.

16. In a pressing mechanism or the like, forming members, means to operate the forming members to mold plastic material between said forming members, and a detecting device operable to render said means inoperative when the molded material sticks to a certain one of the forming members.

17. In a pressing mechanism or the like, forming members, a rotatable table carrying certain of said members, means to operate the forming members to mold plastic material between said forming members, and a detecting device operable to render said means inoperative when the molded material abnormally adheres to one of the forming members, without stopping the rotation of said table.

18. In a pressing mechanism or the like, forming members, a rotatable table carrying at least one of said members, means including a pneumatic ram to operate the forming members to mold plastic material between said forming members, and a detecting device actuated between molding operations and operable to render said ram inoperative when the molded material abnormally adheres to one of the forming members, without stopping the rotation of said table.

19. In a pressing mechanism or the like, forming members, means comprising a pneumatic ram to operate the forming members to mold plastic material between said forming members, and a detecting device operable to render said ram inoperative when the molded material sticks to a certain one of the forming members.

20. In a pressing mechanism or the like, forming members, means to operate the forming members to mold plastic material between said forming members, and a detecting device actuated between molding operations and operable to render said means inoperative when the molded material sticks to a certain one of the forming members.

Signed at Hartford, Conn., this 17th day of December 1920.

KARL E. PEILER.